United States Patent
Perkins et al.

(10) Patent No.: US 9,482,928 B2
(45) Date of Patent: Nov. 1, 2016

(54) APPARATUS FOR FACILITATING MICRO-ROTATIONAL CALIBRATION FOR AN NLO CRYSTAL ENABLED LASER SYSTEM

(71) Applicant: Quantel USA, Inc., Bozeman, MT (US)

(72) Inventors: Mark Perkins, Bozeman, MT (US); Tyler Tempero, Bozeman, MT (US); Zach Halverson, Lansing, IA (US); Ben McGregor, Bozeman, MT (US)

(73) Assignee: QUANTEL USA, INC., Bozeman, MT (US)

( * ) Notice: Subject to any disclaimer, the term of this patent is extended or adjusted under 35 U.S.C. 154(b) by 0 days.

(21) Appl. No.: 14/209,470

(22) Filed: Mar. 13, 2014

(65) Prior Publication Data

US 2014/0268307 A1  Sep. 18, 2014

Related U.S. Application Data

(60) Provisional application No. 61/787,208, filed on Mar. 15, 2013.

(51) Int. Cl.
*G02F 1/35* (2006.01)

(52) U.S. Cl.
CPC ............ *G02F 1/353* (2013.01); *G02F 1/3501* (2013.01); *G02F 2001/3505* (2013.01)

(58) Field of Classification Search
CPC ... G02F 1/353; G02F 1/3501; G02F 2203/69
USPC ................................ 359/326–332; 372/21–22
See application file for complete search history.

(56) References Cited

U.S. PATENT DOCUMENTS

| | | | |
|---|---|---|---|
| 3,962,576 A * | 6/1976 | Kuhl | G01F 1/37 250/201.9 |
| 4,187,027 A | 2/1980 | Bjorklund et al. | |
| 4,578,607 A | 3/1986 | Tojo et al. | |
| 5,272,709 A * | 12/1993 | Dacquay | H01S 3/109 359/328 |
| 5,457,707 A * | 10/1995 | Sobey | G02F 1/39 359/330 |
| 5,644,422 A | 7/1997 | Bortz et al. | |
| 6,614,584 B1 * | 9/2003 | Govorkov | G02F 1/3544 359/328 |
| 6,690,691 B2 * | 2/2004 | Momiuchi | G02B 6/4249 372/20 |
| 7,005,781 B2 | 2/2006 | Smits | |
| 7,443,892 B2 * | 10/2008 | Ma | G02F 1/3544 372/21 |
| 7,447,244 B2 * | 11/2008 | Ma | G02F 1/3501 372/108 |
| 7,453,621 B2 | 11/2008 | Novotny | |
| 8,305,680 B2 * | 11/2012 | Martinez | G02B 7/00 359/326 |

* cited by examiner

*Primary Examiner* — Daniel Petkovsek
(74) *Attorney, Agent, or Firm* — Kagan Binder, PLLC

(57) ABSTRACT

The invention pertains to an apparatus and a method for tuning and then locking a nonlinear crystal to the angle at which phase-matching occurs. It is particularly advantageous to conduct tuning automatically and in the field.

15 Claims, 11 Drawing Sheets

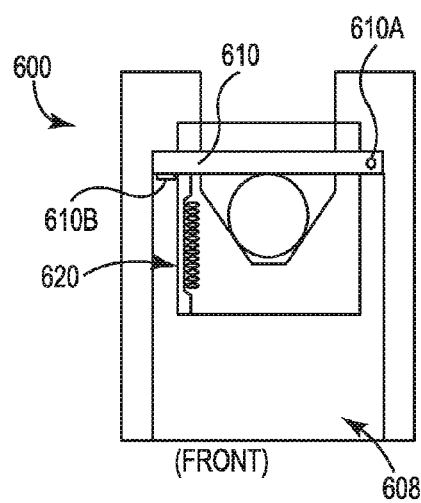
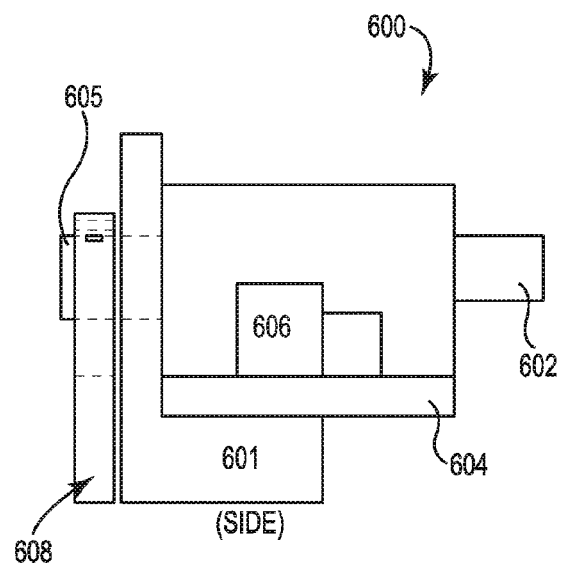
Fig. 6A  Fig. 6B
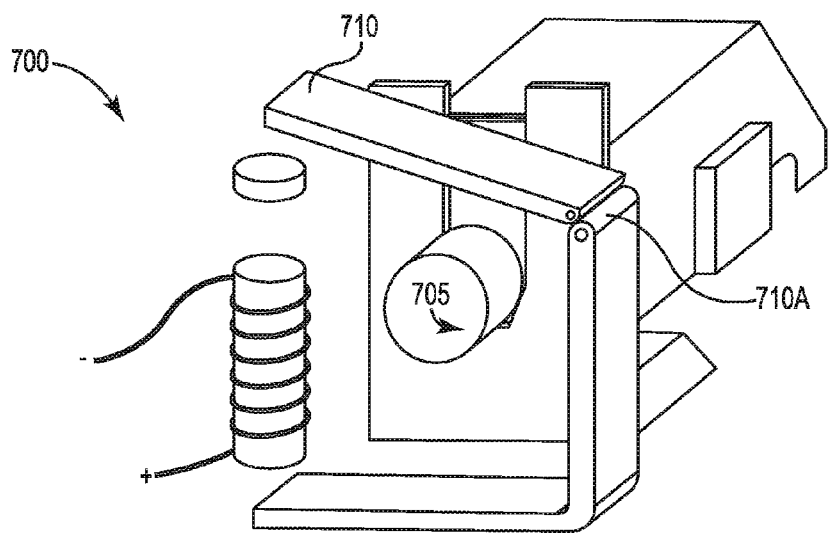
Fig. 7

APPARATUS FOR FACILITATING MICRO-ROTATIONAL CALIBRATION FOR AN NLO CRYSTAL ENABLED LASER SYSTEM

CROSS-REFERENCE TO RELATED APPLICATIONS

This application claims the benefit of U.S. Provisional Patent Application No. 61/787,208, filed Mar. 15, 2013 and titled "APPARATUS FOR FACILITATING MICRO-ROTATIONAL CALIBRATION FOR AN NLO CRYSTAL ENABLED LASER SYSTEM" which application is incorporated herein by reference in its entirety.

FIELD AND BACKGROUND OF THE INVENTION

The invention pertains to the field of nonlinear optical frequency mixing processes and systems.

Lasers are used in a wide array of applications ranging from military to medical uses. Depending on the application, different laser wavelengths may be required. This can be accomplished through the use of Non-Linear Optic (NLO) crystals, which convert the wavelength of light passing through them. However, the generation of radiation at maximum output requires alignment of the optical axis of birefringent crystals at the proper phasematching angle with respect to the direction of propagation of incident laser beams. The phasematching angle is a function of laser frequency and also temperature. This causes the intensity of the radiation which results from the nonlinear mixing process in the crystal to drop off sharply if the frequency of the incident beam varies, if the crystal is rotated slightly from the proper phasematching angle, or if the crystal heats up upon the passage of the laser beams therethrough or due to room temperature fluctuations. In order to return to maximal output, the realignment of the crystal with respect to the beam becomes necessary. The problem becomes amplified in laser systems utilizing many nonlinear optical frequency mixing processes or for systems that need to vary laser frequencies.

One approach to phasematching is described in U.S. Pat. No. 4,187,027 to Bjorklund et al, which is incorporated by reference in its entirety, uses a servo-motor to rotate the crystal mount to achieve phasematching. However, one of the drawbacks to this approach is the potential outgassing component generated by the servo-motor which can eventually cloud up the crystal or be too large to fit in current laser systems.

To optimize this process, NLO crystals should be tuned to maximize energy that is to be converted. This is typically done in two ways, temperature adjustment or regulation and angular rotation to achieve maximum efficiency for the crystal. Once tuned the laser system is then sent to the customer. This is both expensive and time-consuming where the laser system has to be sent back for retuning at a later date.

SUMMARY OF THE INVENTION

In one example embodiment, a micro-rotational stage for a NLO crystal mount is provided that is configured to rotate an optic mount by ±1 degrees with a target of ±2 degrees at a minimum resolution of 100 micro-radians. In a related embodiment, a microrotational mechanism, according to the teachings herein, achieve about 10 micro-radian of resolution. Once the optimal position has been reached, the mount should be securely locked in place. This example embodiment provides an advantage of low cost and fit into the existing laser assembly configuration and produces no outgassing that would interfere with laser function. In this example embodiment, a smart memory alloy (SMA) is used for rotational control and adjustment as well as for locking the crystal setting in place. In yet another related embodiment, a second SMA assembly or a magnet assembly is used for locking the crystal setting in place. The methods described herein provide an advantage over the prior art when used in complex industrial laser systems that experience long time constants and signals with higher noise levels.

SMAs exhibit unique properties and the ability to return to a pre-deformed shape upon heating. In one example embodiment, an SMA member is in the form of a small, 0.006" diameter wire or wires. When a pre-strained SMA wire is heated, it will contract to its original length with a force of about 0.75 lbs. Using this property, an opposing pull design implements two loops of SMA wire around opposite ends of a moment arm (e.g., alumina) attached to a rotatable optic mount of an NLO crystal. Rotation occurs by applying a current to one loop of strained wire causing joule heating and thus contraction of the wire creating a torque on the crystal mount. In a related embodiment, allowing the heated wire to cool and applying a current to the opposing loop of wire will cause rotation in the opposite direction. In a related embodiment, the contraction of one of the wires causes the straining or restraining of the other wire. In yet another related embodiment, two opposing loops of SMA wire of length 1.5" could be used to achieve the required rotation. With respect to the locking mechanism design of this example embodiment, a permanent magnet and a solenoid is used, with the magnet and steel rod of the solenoid being about 0.25" in size. A pull force of 3.9 lbs can be achieved using a 0.25" neodymium magnet and a steel rod wrapped with five layers of concentric windings of copper wire, to which a current is applied. This current will induce a magnetic field in the rod and release the magnet when rotational tuning is needed.

In an example embodiment, a locking torque of 1.5 lb-in. is achieved by a solenoid while a rotational torque of 0.42 lb-in. is provided by the SMA wire(s). Since the locking torque is greater than the rotational torque, the locking mechanism will stop rotation of the optic mount and passively lock the mount in position when de-activated. Furthermore, when the SMA wires are allowed to cool in this position, they will provide additional locking torque because any rotation would require straining of one of the loops of wire.

In one example embodiment, there is provided an NLO crystal arrangement that can be repeatedly tuned by the customer. It is also advantageous to have the ability to lock the crystal position in place once maximum energy has been achieved. This is all accomplished through an automatic, hands-free method. In this example embodiment, the SMA wires are the means for angularly tuning the NLO crystal. The two SMA wires are set up on separate circuits so that they may be independently controlled. By applying a greater current load to one circuit than the other, the wire with the greater load will pull with a greater force, therefore turning the NLO mount. The amount of rotation can be controlled by adjusting the difference between the current loads of the two circuits. This can be either user controlled or computer controlled. The amount of rotation desired will be based upon the total output power (not 2 secondary beams as in the prior art) or scattered light of the laser system. This embodiment provides a means of rotating the mount as part of a system for tuning the laser.

In a related embodiment, automatic tuning of the laser is achieved with the inclusion of a feedback mechanism. There exists a need for an inexpensive energy or power measurement device that would allow information to be gathered for use in a negative feedback loop to optimize optical systems. Our immediate specific use includes optimizing laser resonator operating parameters and optimizing the output from nonlinear optics (NLOs) that generate optical harmonics in near infrared (NIR), visible and ultraviolet (UV) lasers. In this example embodiment, a neodymium-doped crystal laser is used operating near 1060 nm and generating second- and third- or second- and fourth-harmonics at 532 and 355 nm or 532 and 266 nm, respectively. In a related embodiment, a fifth harmonic of 213 nm is added to the system capability. This example embodiment uses a feedback system complete with detectors, transducers and logical control to optimize the laser and NLO operation. This example embodiment includes a transducer for NLO optimization, electronic controls to optimize the laser resonator operation, sufficient computing power on board to accommodate the necessary feedback logic and an energy detector. In this example embodiment of an energy detector, a glass-encapsulated thermistor responds directly to the energy of laser light directed on it even at low mJ levels and a pulse rate of a few Hz at 1064 nm and 532 nm hence coupling thermistors to more wavelength-specific absorbing materials (e.g., one filter and thermistor per wavelength) will not yield absolute values for the output of the laser light, however for purposes of feedback over a few minutes of measurement time, a relative measure of the energy or power at each wavelength should be sufficient to optimize performance to meet our current specifications. In this example embodiment, a 100 k-Ohm negative temperature-coefficient (NTC) thermistor is used to sense the temperature change in the filter material. Numerous filter material are available that provide the specifications for absorption and transmission that we require. For example, a combination of N-WG435, N-WG600 Schott Glasses followed by a short-pass filter glass that will absorb at 1060 nm (of which there are many) will absorb the 266 or 355 nm light followed by 532 and then 1060 nm light so that the energy at each wavelength can be absorbed separately. Combined with a 100 k-Ohm NTC thermistor and an A/D converter, each wavelength can be measured separately and used in a feedback loop for optimization.

BRIEF DESCRIPTION OF THE SEVERAL VIEWS OF THE DRAWINGS

FIGS. 6A and 6B illustrate a side and front view of a piezoelectric device for a locking mechanism according to the teachings herein.

FIG. 7 illustrates a solenoid type locking system example embodiment according to the teachings herein.

DETAILED DESCRIPTION OF THE INVENTION

Following are more detailed descriptions of various related concepts related to, and embodiments of, methods and apparatus according to the present disclosure. It should be appreciated that various aspects of the subject matter introduced above and discussed in greater detail below may be implemented in any of numerous ways, as the subject matter is not limited to any particular manner of implementation. Examples of specific implementations and applications are provided primarily for illustrative purposes.

There is a need for an apparatus and system to make miniscule adjustments in the position of the NLO crystal in a solid-state laser after assembly, to tune the output for maximum performance and increased or desired energy output. The system or device reliably and precisely rotates a mounted laser crystal up to ±2 degrees during tuning, and then locks the crystal into the optimum position; however, the device is re-settable. The desired resolution or increment of rotation is no larger than about 100 micro-radians. The rotational mechanism should not change the temperature of the NLO optic mount by more than 5° C. during its optimization cycle. The temperature tuning of the NLO crystal (heating of the mount) should not cause SMA wire activation and therefore angular rotation of the crystal. The angular rotation mechanism should be able to operate while the laser is on.

Figure 1:
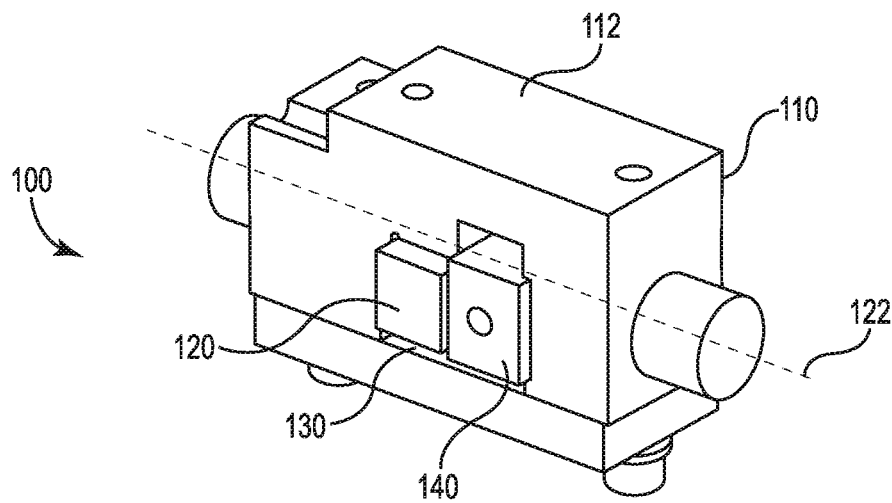
FIG. 1 illustrates a non-linear optic crystal mount assembly according to the teachings herein

Referring now to the Figures, FIG. 1 illustrates an example of an NLO optical crystal mount assembly 100 comprised of a housing 110, an upper mount surface 112 for mounting for thermal regulation (in this example a resistor that acts as a heater is mountable thereon), an NLO crystal 120 mounted therein, and side force assemblies 130 and 140 configured to provide side pressure on crystal 120 and to force two faces against the thermally regulated mount. An axis 122 for rotation of crystal 120 is also shown. In this example embodiment, the dimensions of NLO crystal 120 are 5×5×15 mm.

In one example embodiment, a solid metal wire is heated and its expansion used to achieve the rotation of the NLO crystal. The thermal expansion of the metal is controlled by either controlling the temperature or the current passing through the metal, such as but not limited to copper due to its high conductivity and relatively high rate of thermal expansion. The linear displacement can also be optimized by use of a moment arm of different lengths about a pivot point. The power supply of the laser will provide the power needed to heat the solid metal wire to achieve the desired rotational displacement. Advantages of using this approach include but are not limited to: elimination of outgassing and other undesirable effects from motors used to effect rotation and the low cost of materials.

Shape memory-alloys (SMA's) are an alloy that changes shape when an electrical current or other energy source is introduced. They are referred to by multiple names including SMA, smart metal, memory metal, memory alloy, and muscle wire. SMA's are created by combining alloys of zinc, copper, gold, iron, aluminum, and titanium. The three most common types are copper-zinc-aluminum-nickel, copper-aluminum-nickel, and nickel-titanium (Nitinol). SMA's can be designed for a one-way memory effect or a two-way memory effect. The one-way memory involves the use of cold-working When the SMA is deformed (bent, stretched, etc.) into its cold state, it will hold that shape. When the SMA is heated it will 'remember' its original shape and revert back this configuration. Two-way memory effect, on the other hand, is when the SMA can 'remember' two shapes, one being a high-temperature shape, and one being a low-temperature state. In other words, when the SMA is heated it will take on one shape, and when cooled it will revert back to a different configuration. The shape changing ability of SMAs is based upon transition temperatures for phase changes within the material. The shift between Martensitic and Austenitic phases of the SMA can occur at temperatures around 70 to 90° C. Among many other applications, SMA's have frequently been utilized in small actuators. They are small, quiet, and can create relatively large forces to size (an example is a small linear Muscle Wire actuator manufactured by Miga Motor Company).

One of the challenges in using an SMA rotation device is the rotational control of the NLO crystal stage. Due to the extremely non-linear nature of the SMA response to heat, an active control system should be set up and should be able to measure the angular rotation that is achieved as a current through the wire is adjusted. With the application of up to 400 mA, control of a length was achieved up to 2 mm when using a 75 mm long Nitinol wire. Another control method that was utilized by both of the aforementioned studies was the use of a neural network (NN). In this type of system, the hysteretic effects of heating and cooling the wire are learned by the active system. This allows for precision control of the overall strain of the wires.

In another example embodiment, a piezoelectric approach offers another solution to achieving angular rotation, such as attaching a linearly actuated piezoelectric device to an extension from the axis of rotation. By adjusting the length of the extension or the actuator size, the resolution of the rotation device is adjusted. The rapid response times of piezoelectrics provide for quick, continuous angle changes to the microrotational system and provides for the feature of a locking system for the rotational system. In utilizing a linearly actuating device, angular displacements would be governed by $r \times \theta - 0.5$, where r is the distance from the center of rotation to the actuator, $\theta$ is the angle of rotation and 0.5 is the linear displacement of the mechanism. In a study by Sherrit, et al. the characterization of stack actuators was performed (Sherritt, 2008) and they were able to determine the resolution of certain actuators to be around 300-500 pmIV with a maximum displacement of about 15-20 pm for all tested piezo-stacks. Stack actuators hence are applicable for use in micro-rotational adjustments through total rotation angles of several degrees.

A similar device is described in U.S. Pat. No. 4,578,607 to Tojo et al (1985) entitled Piezoelectric Precise Rotation Mechanism for Slightly Rotating an Object, which is herein incorporated by reference in its entirety, utilizes a fixed base, piezoelectric actuators, and a rotatable stage to achieve this. Two sets of piezoelectric elements are used, each for rotation in the desired direction. By adjusting the voltage to the piezoelectric elements, angular displacements can be achieved in either direction to the desired angular displacement. This design would allow for a voltage to only be applied when angular adjustment is needed. This would allow for a locking mechanism to be used to hold the angle once the desired angle is achieved, and no force or voltage would be applied to the piezoelectrics thereafter. The basic design of this device is a configurable component for use in a microrotational system of an NLO crystal mount.

Another similar device is described in U.S. Pat. No. 7,005,781 to Smits et al (2006) entitled Device for Rotation Using Piezoelectric Benders, which is herein incorporated by reference in its entirety, utilizes two piezoelectric bending actuators connected by a rigid element. By setting up the assembly such that the curvature of the two piezoelectric devices have curvatures in opposite directions, translation is minimized while the angle of rotation is equal to the rotation angle at the tip of the piezoelectric actuator. Although the design of this device was intended for use of angle adjustment of mirrors in MEMS components, due to its small size such is configurable for use in the microrotational mechanism described herein.

Figure 2:
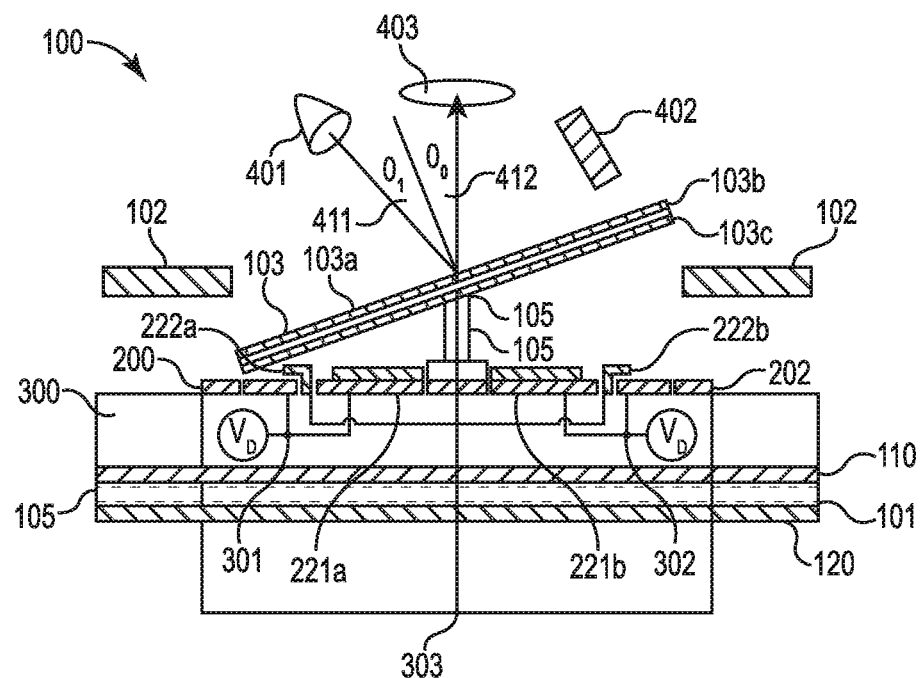
FIG. 2 illustrates a prior art release mechanism using a piezoelectric transducer.

A highly desirable feature of the rotational mechanism described herein is a locking method that securely holds it in place once the ideal position has been achieved. Another device using piezoelectrics is described in U.S. Pat. No. 7,453,621 to Novotny et al (2008), which is herein incorporated by reference in its entirety, is a release mechanism for mirrors in micromechanical systems that includes a rigid bar that clamps down over the rotating member to restrict movement. The bar is fixed at one end and connected to a piezoelectric transducer at the other end (see FIG. 2—release mechanism using a piezoelectric transducer and associated description in Novotny '621 patent). With no voltage applied the rotation is locked by the frictional force and when rotation is desired a voltage is applied across the piezoelectric transducer. This applied voltage causes the transducer to deform creating a gap between the rotating mount and the bar. This design allows for the rotation to be locked in place with no voltage applied. This type of release mechanism is configurable for the microrotational mechanism described herein to be used as a rotation lock in a laser system.

Figure 3A:
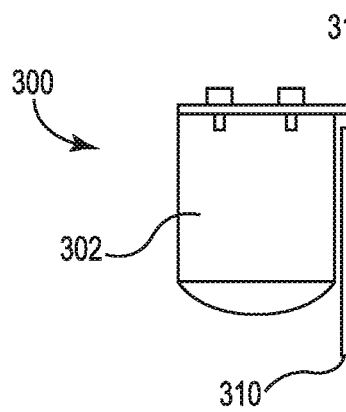
FIGS. 3A and 3B illustrate a side and front view of a piezoelectric device for angular rotation according to the teachings herein.
Figure 3B:
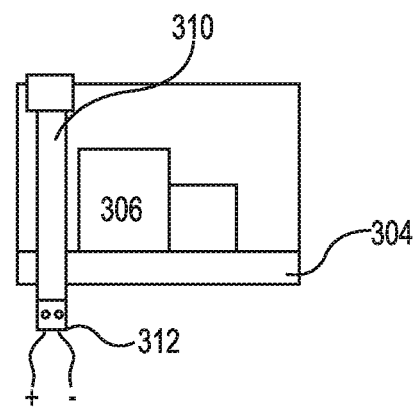

Referring now to FIGS. 3A-3B, there are shown (side and front views) an actuator 300 (300A and 300B) having piezoelectric elements configurable into the design for an angle adjustment system having a main stage 302 with a rounded base plate 304, an optical crystal 306, a piezoelectric element 310 with leads 312. By using bending piezoelectric element 310, the angle of the rotational stage could be adjusted almost instantly. The bending actuator provides a maximum displacement of around 1600 pm (see deflection 310A). In FIGS. 3A-3B the rotational stage rotates about its bottom curved surface. By applying different amounts of voltage to the piezoelectric system, various degrees of rotation can be achieved. By placing a bracket at the top end of the piezo, the actuator could either be used to push or pull the system to the desired angle. The piezoelectric elements have a maximum voltage of positive or negative 90V. The current laser power source uses 24V DC, therefore an amplification system would have to be implemented. Also, this supplied voltage would need to be adjustable in order to reach various levels of displacement. The maximum displacement of the bending actuators is around 500 pm As shown in the deflection calculations, the minimum required for a ±2° rotation is 300-700 pm, once the desired angle of rotation is reached, the stage would be locked into placed. The deflection of the piezoelectric element would then be maintained after the voltage is stopped. This problem may be overcome by using a large enough clamping force for the locking mechanism. As specified by the blocked force of the piezoelectric elements, the maximum force would be around 0.2-0.3 N, depending on the actuator used.

The advantages that this type of system has are near instantaneous response, negligible hysteretic effects, accuracy of the system, minimal thermal effect on the existing system, and zero external energy when the system is not in use. The response of the system is governed by the speed at which the voltage would be adjusted. Also since the degree of deflection is governed by the applied voltage, hysteresis would be reduced. This system is also capable of negative deflections by the application of a negative voltage. This would lead to a ±maximum angular displacement through the use of only one element. Once again depending on the applied voltage, various amounts of deflection could be achieved and therefore the angle of adjustment could be accurately adjusted. When this system is not in use, there would be no external energy needed from the system. By setting up system 300, the effect of the system on the thermal characteristics of the current laser system would be minimized. There would only be one contact point of the piezoelectric element on the micro-rotational stage. This would minimize the thermal conduction from the system. Another key advantage of this system is that outgassing is minimized.

Figure 4:
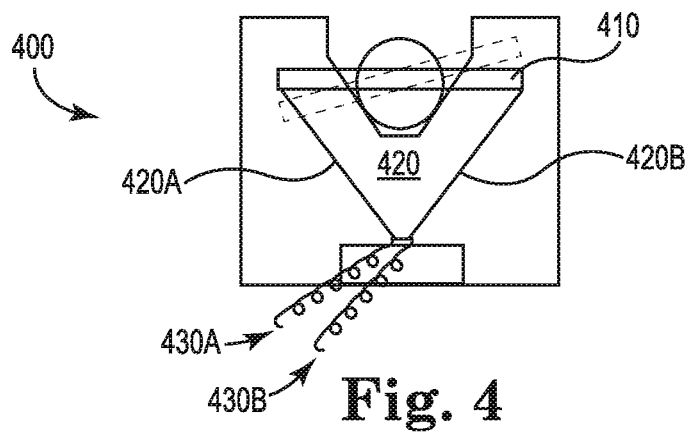
FIG. 4 illustrates a smart wire alloy (SMA) wire opposing pull design for a rotation device according to the teachings herein.

FIG. 4 illustrates an opposing pull type actuator 400 design with an SMA element 420. A current could be applied to one or both wires/leads 430A and 430B to contract the wires 420A and 420B which are attached to a moment arm 410 of suitable radius. The contraction of either wire 420A or 420B (or differing contractions if both were activated) would cause rotation of the optical mount assembly. Current could then be applied to the opposing wire to achieve rotation in the opposite direction.

In this example embodiment, actuator 400 is advantageous due to its simplicity and the cost of full scale manufacture would be relatively low. It would require minimal material and is relatively easy to assemble and the small diameter wire can disperse heat quickly and will have quick cooling times. The material chosen for moment arm 410 has a low thermal conductivity to further decouple any heat transfer effects. In order to account for slower cooling effects to relieve contraction, the opposing wire may be activated to compensate.

Figure 5:
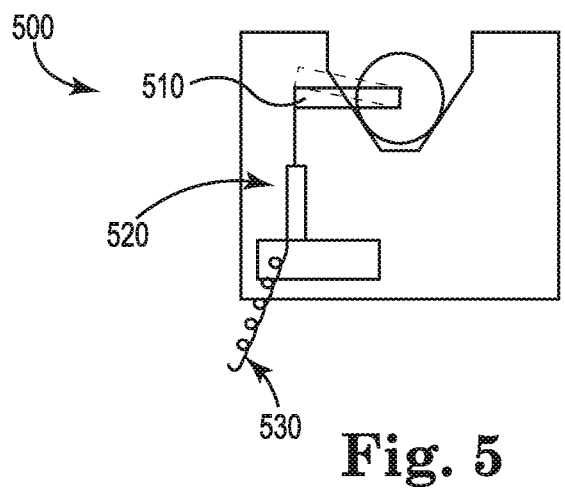
FIG. 5 illustrates an SMA Linear Actuator Design for Rotation according to the teachings herein.

Referring now FIG. 5, there is illustrated a linear displacement actuator 500 that shows how an actuator could be implemented to achieve rotation of an optical mount. Actuator 500 is comprised of a moment arm 510 coupled to an actuator 520 made of SMA materials to give it both a positive and negative displacement. Actuator 520 is electrically connected to lead wires 530 and moment arm 510 when current flows through wires 530 and to activate SMA actuator 520.

In one example embodiment, a piezoelectric device of a locking mechanism 600, such as illustrated in FIGS. 6A and 6B (front and side views), uses a beam 610 pinned at one end 610A and connected to a spring 620 and a piezo element 610B at the other. Upon actuation, the force from the piezoelectric element 610B resists the force from the spring 620, therefore allowing for rotation of the laser crystal stage. The blocked force supplied by the elements is 2.4N. While displacements of such piezo elements are around 20 µm, by adjusting the location of the spring and the length of the moment arm for the piezo-element, the locked and released force from the clamping system could be adjusted. This would allow for the whole beam to be raised off of a rounded protrusion 605 on the main stage 602 and therefore reduce the released clamping force even further. The spring will provide the force necessary to firmly hold the NLO optic in the desired position. This type of clamping system is passive and would require no external energy from the system when rotation of the crystal is not desired. Temperature effects from the piezoelectrics should also be considered, (and isolation from the NLO mount) hence in order to reduce the effect, the locking mechanism stage is made out of a low thermally conductive material. Another example embodiment for thermally isolating the system would be to coat the rounded protrusion with a non-conductive layer. This provides two main advantages, it isolates the locking system from the stage and it provides a resistance against angular rotation. The static force required to cause rotation could be increased by choosing the layer material such that some meshing would be achieved between the locking mechanism and layer.

Another related example embodiment of a spring type system as described in FIGS. 6A-6B includes a release mechanism using a piezoelectric transducer to be used in conjunction with SMA's. When an optimization cycle is required an SMA is used to overcome the force of the springs allowing the NLO optic mount to rotate freely by either a push or pull type device on the unhinged end of the cantilever. Once the optimal angle has been determined the power supply to the SMA is turned off and the spring(s) will once again force the cap down on top of the NLO mount and lock it in place. Optionally, a method of increasing friction, such as roughed surfaces, could be utilized between the contact points to maximize the grip of the locking mechanism. Due to the operating temperature of the system, the SMA may also have to be insulated or thermally decoupled from the system to ensure it does not unlock the mount during laser operation.

Referring now to FIG. 7, one example embodiment illustrates a micro-solenoid assembly 700 for locking an optical mount in place. Solenoid assemblies can provide the force necessary to unlock the optic mount and actuation is extremely fast. Once the optimal angle has been determined power can be shut off to the solenoid assembly thus allowing the mount to be once again locked in place. In this example embodiment, a continuous duty solenoid, is used that can remain on indefinitely to avoid on/off heating issues. Similarly to the piezoelectric locking design (FIG. 6A), a spring is used in solenoid assembly 700 to supply the required clamping force to a rounded protrusion 705. When release of the mechanism is required, power to the push type solenoid is supplied, and the clamping force on the protrusion is reduced. A moment arm 710 is configurable to reach the desired clamping and release force. It may be necessary to place the spring at a farther distance from the pivot point 710A due to lower forces that can be achieved by springs that are within the size constraints of the solenoid assembly. Similar to the previous locking systems described herein, this design is also a passive system that would not require power to maintain the clamping force. This is useful, especially when the laser is powered off In one example embodiment, an SMA assembly was used for the rotational mechanism (see FIG. 4) and a solenoid assembly was used for the locking mechanism. The SMA material used for this embodiment is in wire form (i.e., muscle wire, or trademark Flexinol) with the pull force generated by the wire being directly related to the cross sectional area. The muscle wire can safely contract with a pressure of 25,000 psi at strains of up to 5%, thereby giving the ability to run consistent performance into the millions of cycles. In one example embodiment, a 0.5" moment arm and 0.006" diameter wire were used in the micro rotational mechanism assembly. Using a 0.006" diameter wire enables a constant current to be applied without damage, such as 400 mA (manufacturer recommendation). Wires of diameter 0.006" have cooling times of 1.7 seconds and can pull with a force of about 0.71 lbs., which is doubled to 1.4 lbs. in the loop design. A high-temperature wire (HT) that activates at 90° C. was used due to the NLO mount reaching temperatures for tuning around 70° C. Using HT muscle wire elevates the activation temperature above the tuning temperature and eliminates any unwanted activation of the muscle wire, and thus any unwanted rotation forces to the system.

In a related embodiment, a moment arm of 0.5" long was used as the total deflection at the ends necessary for 2 degrees of rotation would be 0.017 inches and the minimum resolution of 100 micro-radians would translate to $5 \times 10^{-5}$ inches. Analysis showed that using a looped wire design and a total strain of 4.5% applied to a moment arm of 0.5" would require a length of muscle wire of 1.5". In this example embodiment, the solenoid locking system consists of a magnet, metal core, and wire coil around the core for the solenoid, as well as, a flexible locking arm to apply the friction force to prevent rotation of the NLO mount. In one example embodiment, a 0.25" magnet (a Neodymium magnet was used which was 0.25" in diameter and 0.125" thick and an available pulling force of 3.9 lbs.) with a 0.5" long 0.25" diameter steel rod was used to provide good locking force. The function of a solenoid relies on a coil of wires around a metal core to induce a magnetic field which opposes the magnetic field of the permanent magnet. In order to determine the size of wire to use and the number of windings needed, considerations were made for temperature control of the locking mechanism. The number of windings on the solenoid was set at 135, which required 5 layers over the length of the solenoid. The total deflection of this arm was calculated using the opposing magnetic fields of the solenoid and the magnet. The maximum deflection of the aluminum bar chosen was found to be 0.042 in. This was based upon the dimensions of the locking arm to be 0.5 in wide and 0.85 in wide. The bar also has a cutout that will allow for screw access when installing the NLO housing.

In one example embodiment, alumina was selected as the rotation arm material due to it being electrically nonconductive and sufficiently strong to withstand the pulling forces exerted by the muscle wire. Deflection calculations showed that $\frac{1}{8}$" diameter alumina rod would have a deflection on the order of 17 microns in the stationary position (meaning no rotation) and a safety factor against failure of around 125. Crimping was used to connect the SMA wire to the electrical leads. Finally, the lead wires were screwed tightly to the housing, completing the rotation design. The locking mechanism involves a 0.25" steel rod as the core material due to its magnetic properties in order to attract the permanent magnet. The flexible locking bar is made of aluminum and a soft rubber pad is adhered to the locking bar at the contact of the boss to increase friction. The locking bar is screwed down to the plastic housing using the same M3 screws as in a previous design.

In this example embodiment, the torque produced by the SMA assembly was about 0.427 lb-in and the locking torque was 1.15 lb-in. Hence, the locking torque available is greater than the rotational torque provided by the SMA wire. Therefore, the locking bar should prevent rotation when the solenoid is not actuated. One of the unique properties of muscle wire is that no contraction takes place upon cooling like a traditional metal. Therefore, once the locking bar stops the rotation of the mount and the muscle wire has had time to cool, it will actually serve as an additional resistance to rotation since it would take a force to elongate the wires in either direction. With the torque provided by the locking bar and the additional locking torque of the muscle wires, the NLO mount locks firmly in place.

In this example embodiment, a loop of muscle wire is used which has two times the pulling force since two lengths of wire will be contracting. The opposing pull design requires that the wire that is not being contracted be stretched by the opposing wires. The net pulling force would be decreased by the force required to stretch the wire. The forces in the muscle wire, along with the torques generated for the varying radii, are sufficient to provide rotation of the optic mount.

In this example embodiment, Aluminum Oxide (Al2O3), or alumina, was chosen as the material to be used as the moment arm. Alumina was chosen due to its dielectric properties, cost, strength, and machinability. Assuming a fixed cantilever beam of circular cross section, bending stress was also calculated and was found to have a safety factor of around 16 and 125 for $\frac{1}{16}$" and $\frac{1}{8}$" rods, respectively. The $\frac{1}{8}$" diameter rod was preferred.

Figures 8A, 8B:
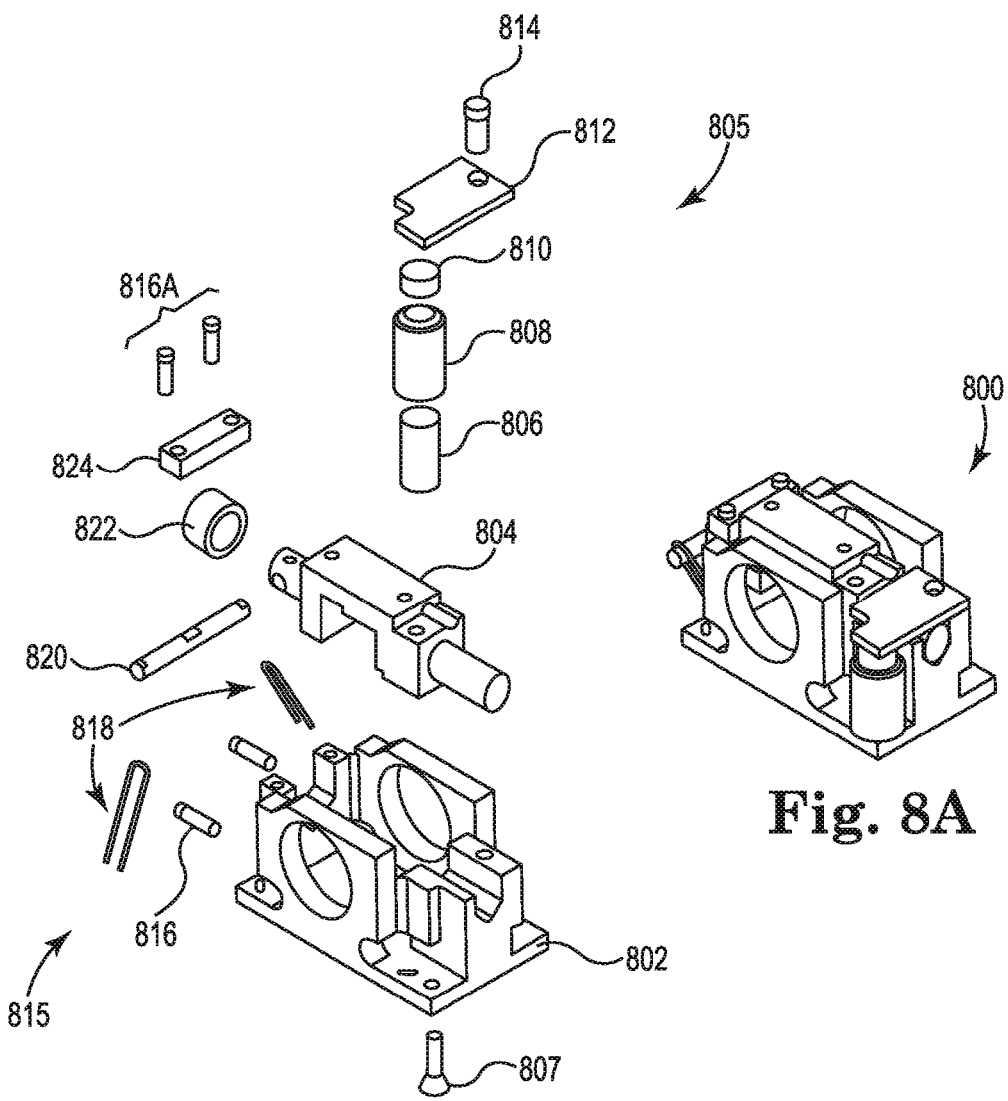
FIGS. 8A and 8B illustrate a perspective and exploded view of a microrotational apparatus according to the teachings herein.
Figure 9:
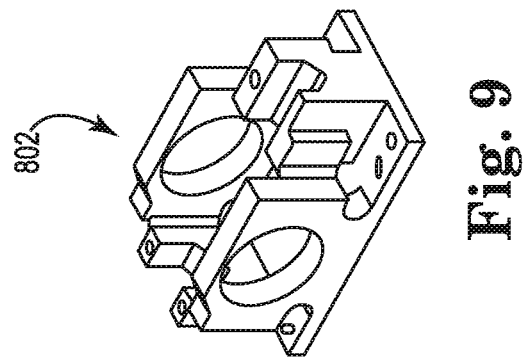
FIGS. 9 and 9A-9E illustrate an optic housing in a perspective view and the housing in various views including a front view 802A, a top view 802B, a right side view 802C, a left side view 802D and a bottom view 802E, respectively, which are components of a microrotational apparatus according to the teachings herein.
Figure 9C:
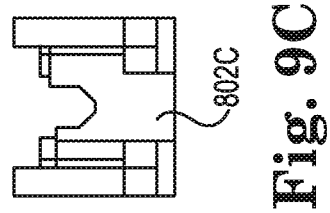
Figure 9B:
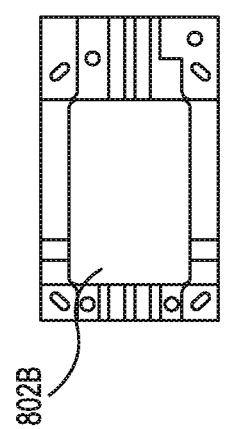
Figure 9A:
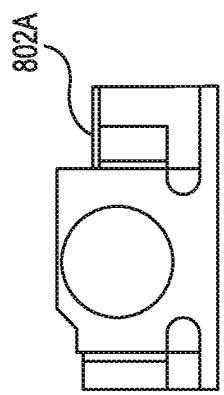
Figure 10:
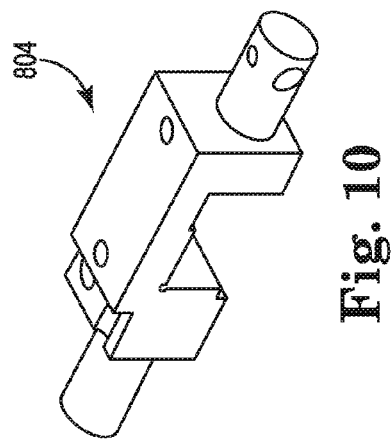
FIGS. 10-10E illustrate various views of an NLO optic mount 804 including a front view 804A, a top view 804B, a right side view 804C, a left side view 804D and a bottom view 804E, respectively, which are components of a microrotational apparatus according to the teachings herein.

Referring now to FIGS. 8-10, there is illustrated an example embodiment of a microrotational apparatus 800 for an NLO module. In FIGS. 8A-8B, apparatus 800 includes a housing 802, an NLO optic mount 804, a solenoid locking assembly 805 and a microrotational tuning assembly 815. In this example embodiment, SMA wires are used to both unlock the NLO crystal mount for rotation and to rotate the crystal. The module is in a locked configuration until power is applied to a locking SMA circuit. This will result in a passive locking system that will remain locked even after the whole laser system is shutdown. In this example embodiment, the rotational SMA wires are designed such that the total rotation of the system will be ±2 degrees. The order of operation: when the locking SMA wire(s) is activated, the rotational SMA wires will be activated and adjusted until the desired rotational angle is achieved, Thereafter, the locking SMA wire(s) will be deactivated and a short amount of time after that the rotational SMA wires will be deactivated.

In this example embodiment, rotational and locking apparatus 800 includes a housing 802, an NLO optic mount 804, a solenoid locking assembly 805, and a microrotational tuning assembly 815. In particular, apparatus 800 is comprised of:

a main NLO assembly housing 802 (made of plastic (Delrin);

an optic mount 804 (in this example embodiment, made from aluminum);

a solenoid assembly 805 (comprised of iron rod 806, anchor pin 807, solenoid 808, solenoid cylinder 806 (low carbon steel), Neodymium magnet 810, locking bar 812 and screws 814); and a rotational assembly 815 (comprised of anchor pins 816, SMA (nitinol) wire 818, rotational (alumina) rod 820, a bearing 822, locking bar 824 and lock pins 816A.

Figure 9E:
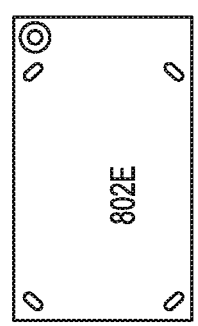
Figure 9D:
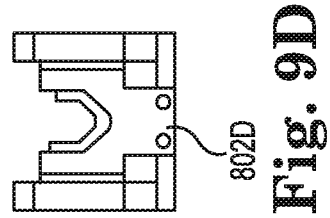
Figure 10E:
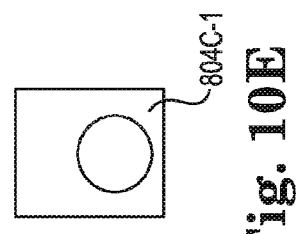
Figure 10B:
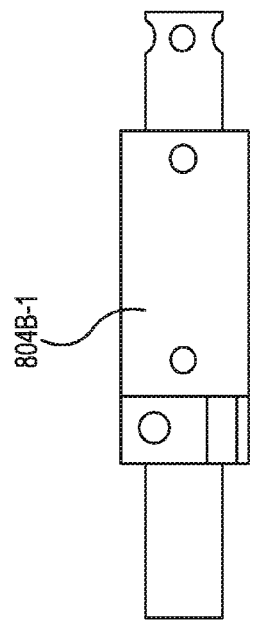
Figure 10A:
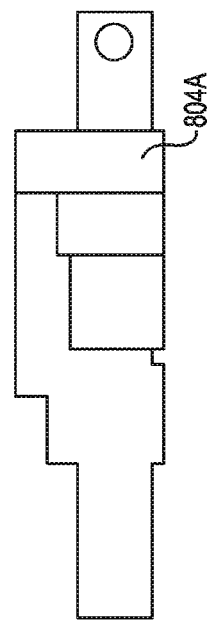
Figure 10C:
Figure 10D:
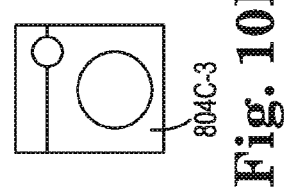

FIGS. 9-9E illustrate optic housing 802 in various views including a front view 802A, a top view 802B, a right side view 802C, a left side view 802D and a bottom view 802E. Similarly, FIGS. 10-10E illustrate NLO optic mount 804 in various views including a front view 804A, a top view 804B, a right side view 804C, a left side view 804D and a bottom view 804E. Housing 802 (which holds the mount in position) is made of Ultem, a glass epoxy composite. Alternatively, the housing is made of Delrin.

Figure 11A:
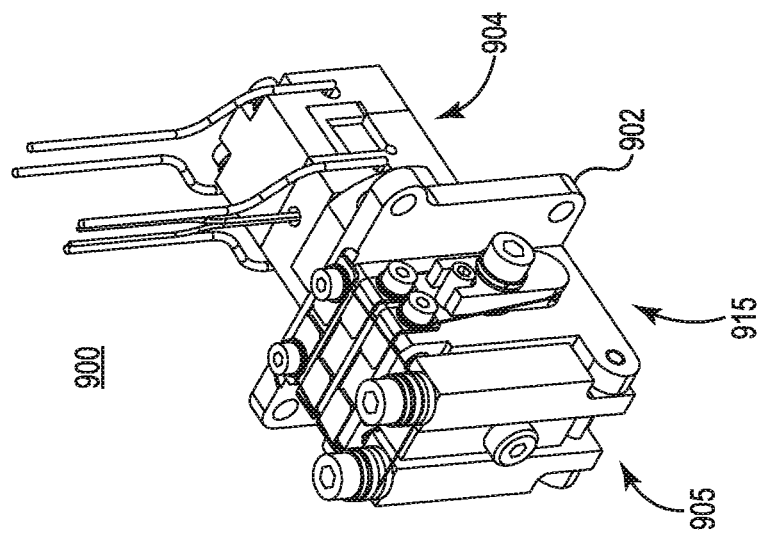
FIGS. 11A and 11B illustrate another example embodiment of an NLO rotational and locking assembly according to the teachings herein.
Figure 11B:
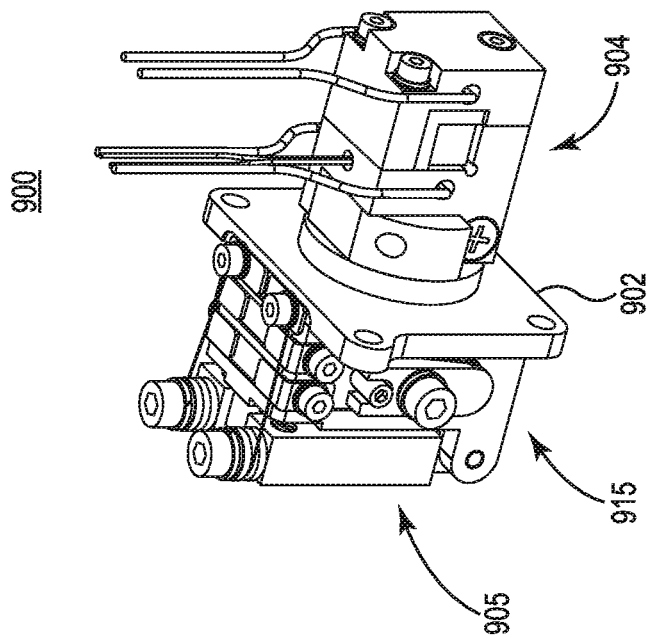

Referring now to FIGS. 11A-11B and 12A-12F there are illustrated other example embodiments of an NLO rotational and locking assembly 900 according to the teachings herein. In particular, FIGS. 11A and 11B illustrate two perspective views of NLO assembly 900 having an NLO base 902, an NLO rotational stage 904, a locking assembly or mechanism 905 and a tuning or rotation mechanism (or assembly) 915.

Figure 12A:
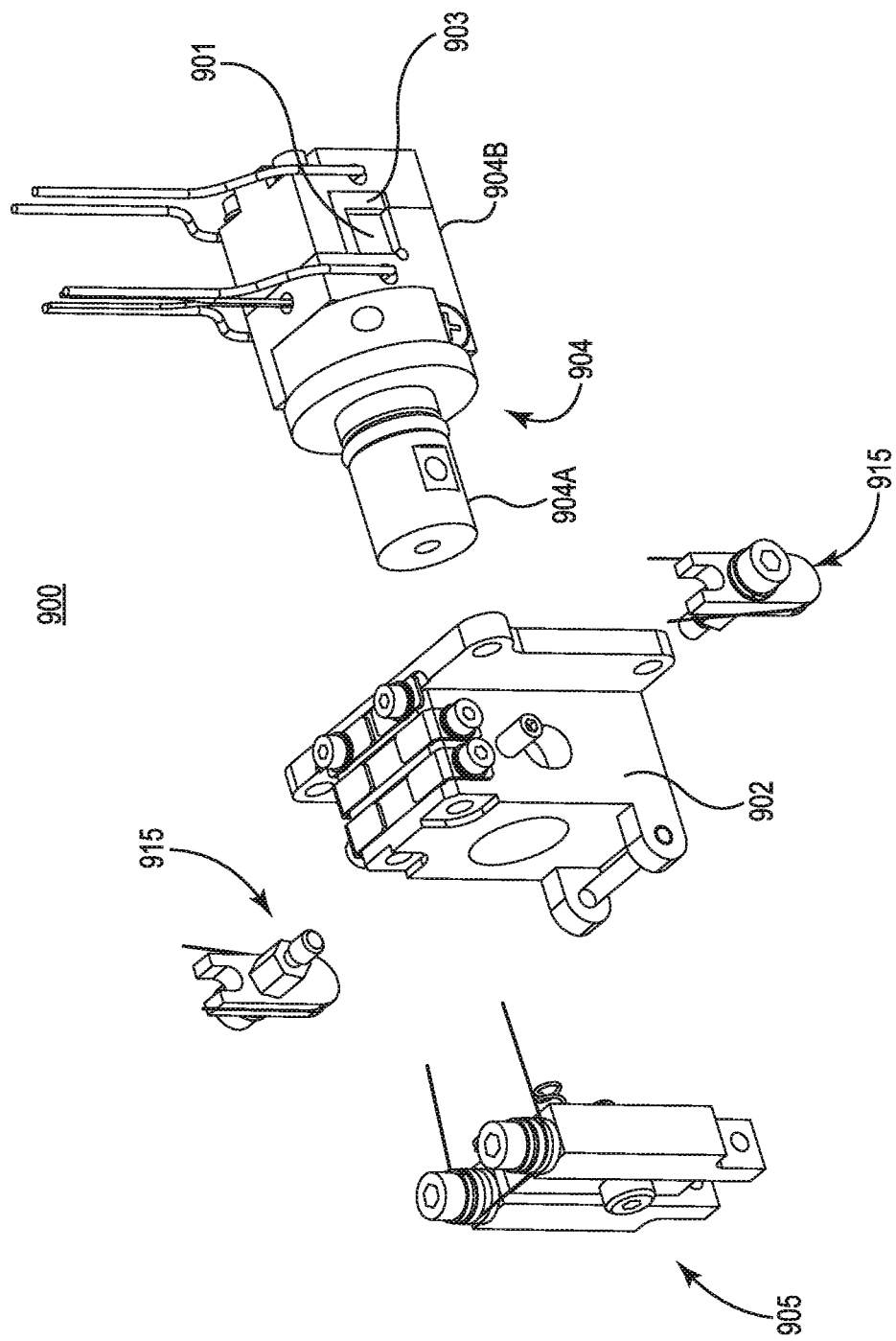
FIG. 12A illustrates an exploded view of the NLO assembly of FIG. 11A-11B.
Figure 12B:
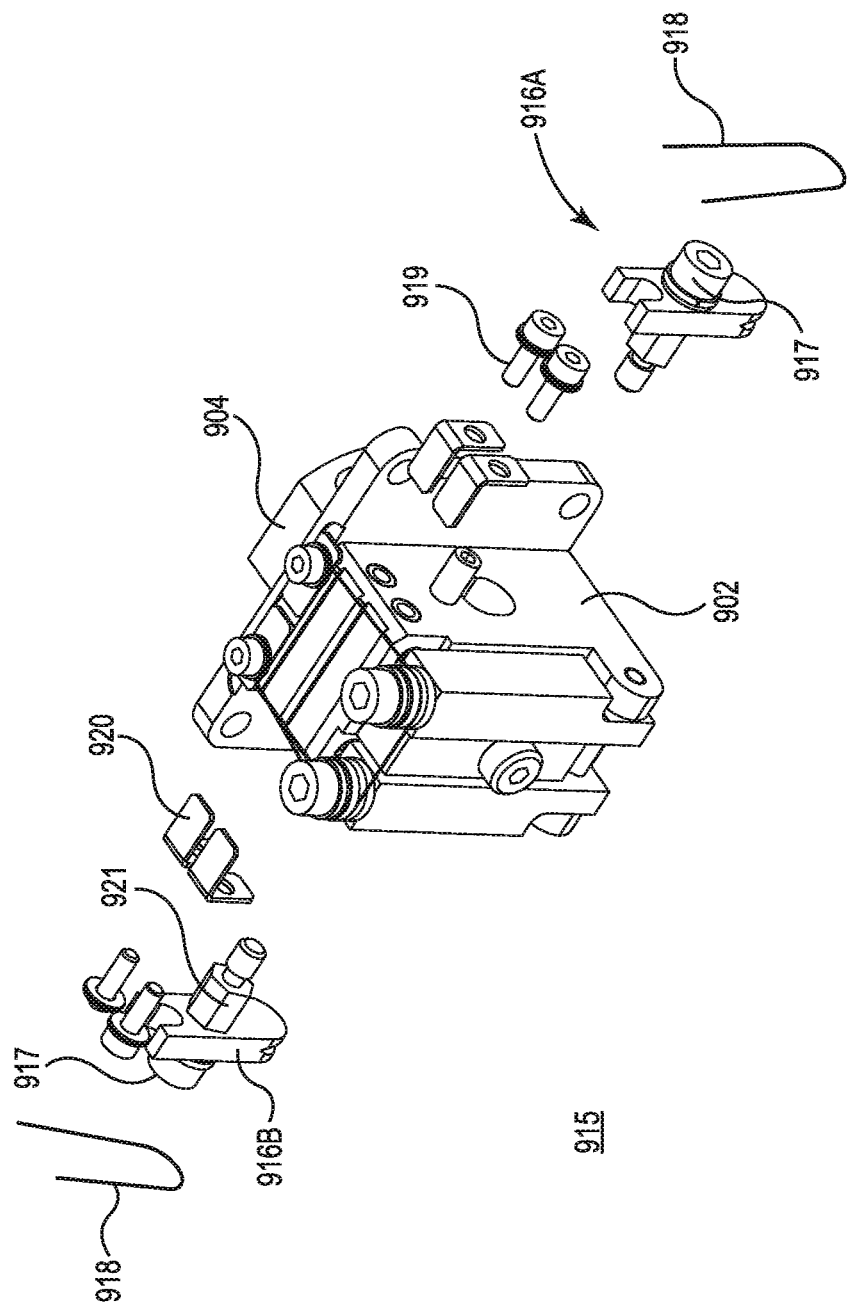
FIG. 12B illustrates an exploded view of the rotation parts of the NLO locking assembly of FIGS. 11A-11B.

More particularly, FIG. 12A illustrates an exploded view of the NLO assembly 900 and while FIG. 12B illustrates an exploded view of the rotation parts of NLO assembly of FIG. 11. In this example embodiment, the rotation mechanism includes an NLO crystal 901, a thermal gap pad 903, a fixed NLO base 902, an NLO rotational stage 904 (comprised of parts 904A and 904B), a set of rotational moment arms 916A (with rotational pulleys 916B) secured by screws 917 with electrical standoffs 921, two SMA wires 918, screws 919 for securing the wires and electrical contacts 920. The fixed NLO base is a means for securing the NLO crystal assembly into the laser system and provides a secure location to fix the ends of the SMA wires. The rotational NLO stage is configured to facilitate rotation of the crystal about the axis that is pertinent to a frequency generation of the NLO crystal that is being used. Rotational moment arms 916A are secured to the rotational NLO stage and are coupled to electrical standoffs 921, cap screws 917, and electrically insulating rotation pulleys 916B.

Figure 12C:
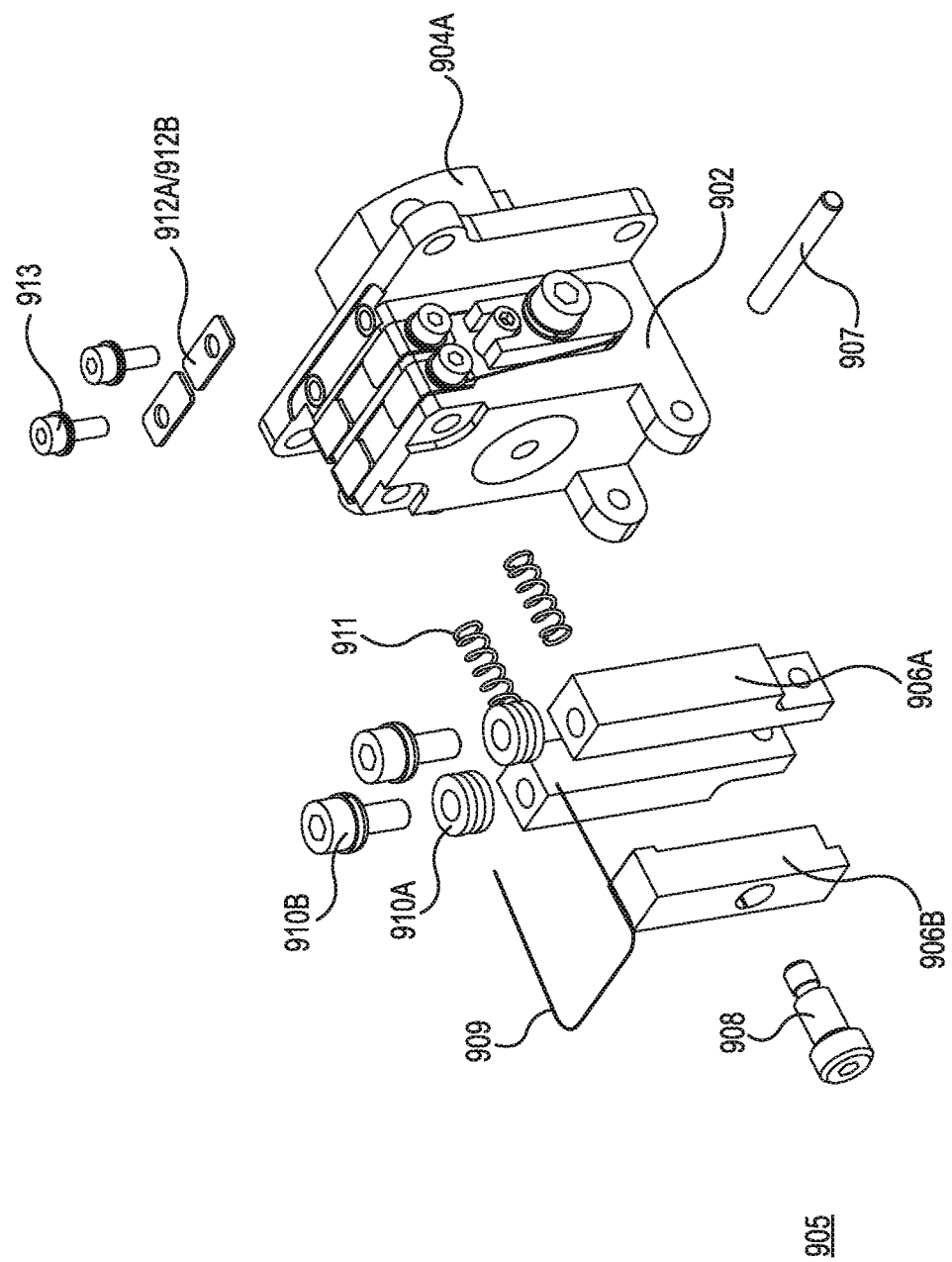
FIG. 12C illustrates an exploded view of the braking parts of the NLO assembly of FIGS. 11A-11B.

Referring to FIGS. 12B and 12C, SMA wires 918 are secured to NLO base 902 in a manner similar to the locking mechanism with screws and electrical contacts, thereby facilitating the use of the opposing pull design for the SMA wires. When one wire is activated, it will stretch the opposite wire while rotating NLO rotational stage 904. Rotation in the opposite direction occurs by applying current to the opposite SMA wire. Through computer control, the rotation angle of this rotational system is controlled within 100 micro-radians of the desired angle.

Referring further to FIG. 12C, there is illustrated an exploded view of the braking parts (or locking mechanism) 905 of the NLO assembly 900 of FIG. 11. In this example embodiment, locking mechanism 905 includes but is not limited to a first and second locking levers 906A and 906B, a shoulder screw 908, two locking pulleys 910A, screws 910B for securing the pulleys, SMA wire 909, two screws 913 for securing the SMA wire, two electrical contact shims 912A and 912B, two springs 911, a pin 907 for a pivot location, an NLO base 902 and an NLO rotational stage 904. The rotation mechanism is configured to apply a braking force in the direction of the axis of rotation of the NLO rotation stage or mount to minimize undesirable rotation during locking Two locking levers 906A and 906B operate such that the first locking lever will have the SMA wires pulling against a spring at the top and the pivot pin at the bottom. The second locking lever will rest against the NLO base at the top as a pivot point and rest against the other lever at the bottom. Locking pulleys 910A are configured with a radius that would be appropriate for the bending radius of the SMA wire. SMA wire 909 is secured in place by wrapping the wire around one of contact screws 913 and tightening it. This screw will hold the SMA wire in contact with an electrically conductive shim 912 and also fix the end of the wire in place. A first electrical contact shim 912A and screw 913A provide the path or conductor for applying current to the SMA wire. The SMA wire is located around the outside of both locking pulleys and then secured under a second electrical contact shim 912B and screw 913B. The SMA wire length is selected such that when activated, the force from wire 909 will overcome the force of springs 911 and cause a linear displacement of about 0.040 inches at the top of the first locking lever. This will result in about a 0.005 inch displacement at the bottom of the second locking lever. This in turn will result in about a 0.002 inch gap between the second locking lever and the shoulder screw. A shoulder screw is fixed securely to the NLO rotational stage. Therefore, upon release of the brake, the NLO rotational stage will be free to rotate. When deactivated, the force from the springs greatly exceeds the force required to restrain the SMA wires, therefore stretching the wires and locking the NLO crystal angle.

Figure 12F:
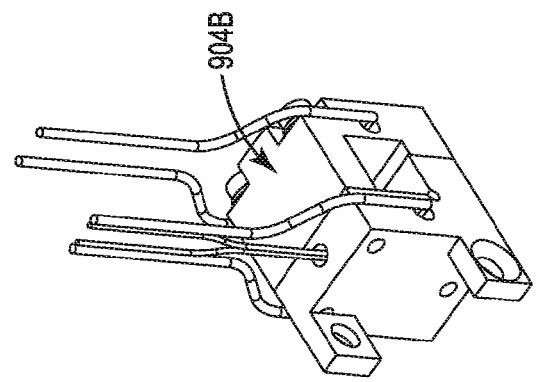
FIGS. 12D-12F illustrate exploded and perspective views of a crystal assembly portion of the NLO assembly of FIGS. 11A-11B.
Figure 12E:
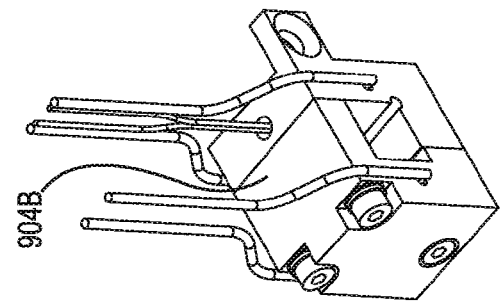
Figure 12D:
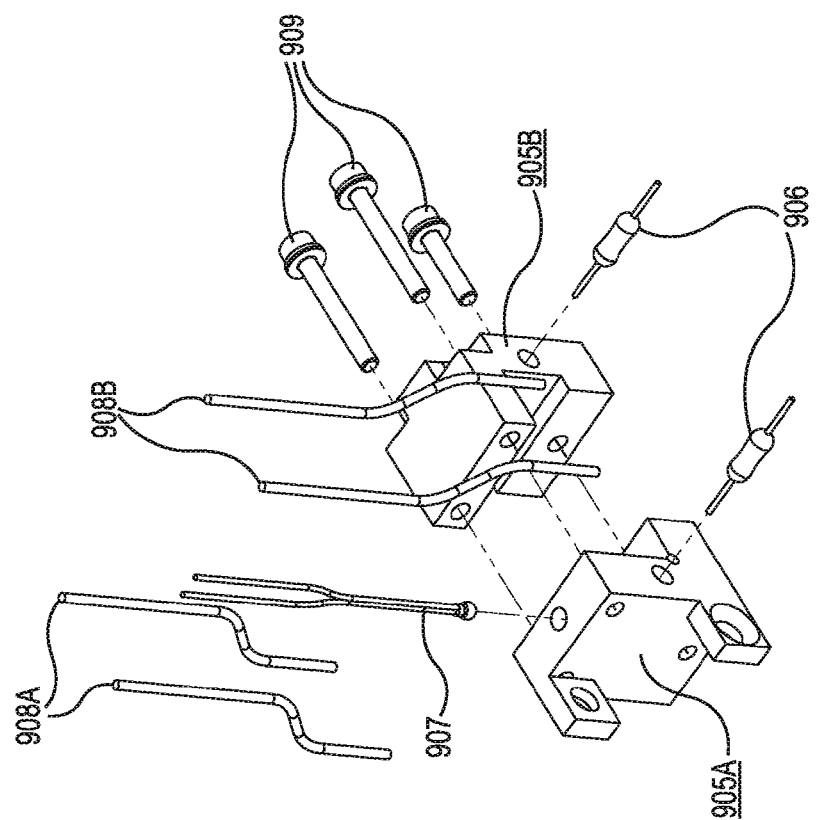

FIGS. 12D-12F illustrate an exploded view and two perspective views, respectively, of an assembly portion 904B of NLO assembly 900 of FIGS. 11A-11B. In this example embodiment, a crystal assembly 901 is configured for 6 mm cross-section non-linear crystals, but is configurable for other sizes. In this example embodiment, it consists of a two part mount 905A and 905B for holding crystal 901 on one side, the retainer for clamping the crystal into place, a thermistor 907 for temperature feedback, two resistors 906 for crystal heating, electrical leads 908A and 908B to the resistors, and screws 909 to hold it in place. Crystal 901 is placed against two edges in the mount and then a thermal gap pad 903 is used in conjunction with the retainer to hold the crystal in place. The gap pad is thermally conductive and deformable. The thermal conduction is for more uniform temperature across the crystal and the deformation is to reduce stresses within the crystal. Crystal assembly 904B is designed such that it can be removed from the NLO rotational and braking mechanism 900 without removing both the crystal and gap pad from the assembly.

In a related embodiment, automatic tuning of the laser is achieved with the inclusion of a feedback mechanism. There exists a need for an inexpensive energy or power measurement device that would allow information to be gathered for use in a negative feedback loop to optimize optical systems. Our approach includes optimizing laser resonator operating parameters and optimizing the output from nonlinear optics (NLOs) that generate optical harmonics in near infrared (NIR), visible and ultraviolet (UV) lasers. In this example embodiment, a neodymium-doped crystal laser is used operating near 1060 nm and generating second- and third- or second- and fourth-harmonics at 532 and 355 nm or 532 and 266 nm, respectively. This example embodiment uses a feedback system complete with detectors, transducers and logical control to optimize the laser and NLO operation. This embodiment also addresses the need for system integrators to spend time making fine adjustments to the laser systems that consume valuable time. This example embodiment includes a transducer for NLO optimization, electronic controls to optimize the laser resonator operation and sufficient computing power on board to accommodate the necessary feedback logic. This leaves the inclusion of an energy detector as the element needed to complete the solution, which is described hereafter.

In this example embodiment of an energy detector, a glass-encapsulated thermistor responds directly to the energy of laser light directed on it even at low mJ levels and a pulse rate of a few Hz at 1064 nm and 532 nm. Hence coupling thermistors to more wavelength-specific absorbing materials (e.g., one filter and thermistor per wavelength) will not yield absolute values for the output of the laser light, however for purposes of feedback over a few minutes of measurement time, a relative measure of the energy or power at each wavelength should be sufficient to optimize performance to meet our current specifications. For this it is desirable to understand the rate at which heat is lost from the absorbing filter materials thereby determining the amount of heat needed in the form of absorbed light to measure the light energy or power. First, consider than the thermistor will have copper wire leads to connect it to the measurement electronics. In this example, the thermistor uses copper lead wires of 30 AWG (0.010") wires 5 cm in length, which is used to calculate the corresponding heat transfer to (and conductive heat losses of) a 8 mm×8 mm×1 mm square filter having a mass of about 0.15 g. This leads to a power/temperature dependence of 130 mJ/K, with the filter having a time constant of about—90 s to rise to ½ of its asymptotic final temperature for a given input power to the filter. Optimally, a final temperature rise for a 1.5 mJ/s input is 1 degree C. and in this example embodiment a 1 degree C. change is observed in 90 s with a 3 mJ/s input power.

In this example embodiment, a 100 k-Ohm negative temperature-coefficient (NTC) thermistor is used to sense the temperature change in the filter material. The fractional change of a typical 100 k NTC thermistor at 20 C is about 5%. An 8-bit analog to digital converter (A/D) will introduce an uncertainty of 0.4% into a single measurement of the resistance of this device allowing temperature differences to be determined with an uncertainty of less than 0.1 degree. A 10-bit A/D converter reduces that uncertainty to 0.01 degree. Combining the above analysis with expected measurement uncertainty suggests that a precision of 1% is possible for absorbed an absorber power of as little as—1 mJ/s. This represents less than 1% of the output energy of most of our standard products and shows that a simple reflection from the final window in our laser systems is sufficient to provide enough information to optimize the output of the laser and the NLOs. Numerous filter material are available that provide the specifications for absorption and transmission that we require. For example, a combination of N-WG435, N-WG600 Schott Glasses followed by a short-pass filter glass that will absorb at 1060 nm (of which there are many) will absorb the 266 or 355 nm light followed by 532 nm and then 1060 nm light so that the energy at each wavelength can be absorbed separately. Combined with a 100 k-Ohm NTC thermistor and an A/D converter, each wavelength can be measured separately and used in a feedback loop for optimization.

In one example embodiment, a method is provided of optimizing a converted frequency of an optical beam that includes the steps of directing an input optical beam into a non-linear crystal to generate an output optical beam having a frequency that is different from the frequency of the input optical beam, the input optical beam having a first power level and the output optical beam having a second power level. The method also includes monitoring the second power level and producing a signal representative of the second power level to determine conversion efficiency in the crystal, and in response to the representative signal, tuning the non-linear crystal by mechanically adjusting a condition of operation of the crystal such that a value of the representative signal is within a predetermined range. In this example embodiment, the step of tuning includes adjusting a temperature of the crystal by applying heat to the crystal until the representative signal is within the predetermined range. The method according to claim 1 further comprising the step of collecting scattered light from the output optical beam as part of a feedback signal for optimizing the crystal.

In a related embodiment, the method further includes tuning in the form of adjusting an angle of propagation of the input beam with respect to the crystal by rotating the crystal to optimize the representative signal. Also included in this method is the step of locking movement of the crystal upon reaching the optimized signal and further unlocking movement of the crystal and applying an electromechanical force that adjusts the angle of the crystal until reaching the optimized signal.

In another example embodiment, there is provided an apparatus for servo-locking an angular orientation of a nonlinear crystal with respect to the direction of an input laser beam that includes means for supporting said nonlinear crystal in a rotatable mount, the nonlinear crystal adapted to generate from the input laser beam an output beam with a converted frequency component and also includes means for generating an output power level in response to an intensity of the converted frequency component of the output beam and for producing a signal representative of the output power level. The apparatus further includes means for producing a signal representative of the output power level and means for rotating the rotatable mount in response to the representative signal. The apparatus also includes means for collecting scattered light from the output beam to form part of the representative signal.

Having thus described several illustrative embodiments, it is to be appreciated that various alterations, modifications, and improvements will readily occur to those skilled in the art. Such alterations, modifications, and improvements are intended to be part of this disclosure, and are intended to be within the spirit and scope of this disclosure. While some examples presented herein involve specific combinations of functions or structural elements, it should be understood that those functions and elements may be combined in other ways according to the present invention to accomplish the same or different objectives. In particular, acts, elements, and features discussed in connection with one embodiment are not intended to be excluded from similar or other roles in other embodiments. Accordingly, the foregoing description and attached drawings are by way of example only, and are not intended to be limiting.

What is claimed is:

1. An apparatus for servo-locking an angular orientation of a nonlinear crystal with respect to the direction of an input laser beam comprising:
  a crystal mount assembly to support said nonlinear crystal in a rotatable optic mount, said nonlinear crystal adapted to generate from the input laser beam an output beam with a converted frequency component;
  an energy detector and an A/D converter for generating an output power level in response to an intensity of said converted frequency component of said output beam;

a computer controller for producing a an feedback electrical signal representative of the output power level a rotational assembly including a shape memory alloy (SMA) assembly for angularly rotating said rotatable mount in response to said representative electrical feedback signal; and a locking mechanism in operative contact with the rotational assembly and configured to secure the rotational assembly, the locking assembly further configured to release the rotational assembly in response to an electrical signal to allow angular rotation of the rotatable mount.

2. The apparatus according to claim 1 further comprising means for collecting scattered light from the output beam to form part of said representative signal.

3. The apparatus according to claim 1 wherein the rotational assembly is controlled continuously so as to tune the output beam to a desired wavelength or frequency.

4. The apparatus according to claim 3 wherein the rotational assembly is controlled continuously up to ±2 degrees within about 100 micro-radians of a desired angle so as to tune the output beam to a desired wavelength or frequency.

5. The apparatus according to claim 1 wherein the locking mechanism or a stop member are adapted to secure the optic mount in a defined position, said locking mechanism or stop member configured to be actuated in an open and a closed position.

6. The apparatus according to claim 5 wherein the locking mechanism comprises a shape memory alloy assembly configured to open and close the locking mechanism responsive to an electric signal.

7. The apparatus according to claim 1 wherein the angular rotational assembly is secured by the locking mechanism having a second SMA assembly responsive to an electric signal from the computer controller.

8. The apparatus according to claim 1 further comprising a resistive heating assembly disposed about said nonlinear crystal, said resistive heating arrangement configured to vary a temperature of said crystal.

9. The apparatus according to claim 1 further comprising a thermal gap member disposed within the crystal mount assembly and in operative contact with said non-linear crystal, said thermal gap member adapted to reduce stress and balance the temperature throughout said crystal.

10. A laser system according to claim 1 further comprising a transducer for non-linear crystal tuning for maximizing energy that is to be converted from the input laser beam.

11. The laser system according to claim 10 further comprising electronic controls for tuning a laser resonator operation as a function of output wavelength of the laser light.

12. An apparatus for servo-locking an angular orientation of a nonlinear crystal with respect to the direction of an input laser beam comprising:

a crystal mount assembly to support said nonlinear crystal in a rotatable optic mount, said nonlinear crystal adapted to generate from the input laser beam an output beam with a converted frequency component;

an energy detector and an A/D converter for generating an output power level in response to an intensity of said converted frequency component of said output beam; a rotational assembly including a shape memory alloy (SMA) assembly for angularly rotating said rotatable mount in response to an electrical signal, wherein the rotational assembly is controlled continuously so as to tune the output beam to a desired wavelength or frequency; and a locking mechanism in operative contact with the rotational assembly and configured to secure the rotational assembly, the locking assembly further configured to release the rotational assembly in response to another electrical signal to allow angular rotation of the rotatable mount.

13. The apparatus of claim 12 further comprising a computer controller responsive to the A/D converter for producing an feedback electrical signal representative of the output power level, and wherein the a rotational assembly is responsive to said representative electrical feedback signal to automatically tune the non-linear crystal to the desired wavelength or frequency.

14. The apparatus of claim 12 wherein the angular rotational assembly is secured by the locking mechanism having a second SMA assembly responsive to an electric signal from a computer controller.

15. The apparatus of claim 12 wherein the SMA assembly facilitates control of angles or position of the crystal so as to increase output energy.

* * * * *